United States Patent [19]

Horowitz

[11] 4,076,328
[45] Feb. 28, 1978

[54] TRACTOR-TRAILER PARKING DASH CONTROL VALVE WITH TWO-WAY CHECK VALVE

[75] Inventor: Charles Horowitz, Niles, Ill.

[73] Assignee: Sloan Valve Company, Franklin Park, Ill.

[21] Appl. No.: 715,441

[22] Filed: Aug. 18, 1976

Related U.S. Application Data

[63] Continuation of Ser. No. 575,469, May 7, 1975, abandoned.

[51] Int. Cl.² ............................................. B60T 13/38
[52] U.S. Cl. .................................. 303/50; 137/625.27; 303/71; 303/84 A
[58] Field of Search .................... 303/7, 9, 13, 50, 56, 303/54, 71, 6 R, 84; 188/170, 3; 137/627.5, 625.27, 625.5

[56] References Cited

U.S. PATENT DOCUMENTS

| 2,463,325 | 3/1949 | Slomer | 303/13 |
|---|---|---|---|
| 3,109,456 | 11/1963 | Horowitz et al. | 303/50 X |
| 3,456,988 | 7/1969 | Gibbons et al. | 303/71 X |
| 3,511,260 | 5/1970 | Benjamin | 137/625.27 X |
| 3,790,222 | 2/1974 | Fannin | 303/9 |
| 3,841,714 | 10/1974 | Schultz | 303/71 |

Primary Examiner—Trygve M. Blix
Assistant Examiner—Douglas C. Butler
Attorney, Agent, or Firm—Kinzer, Plyer, Dorn & McEachran

[57] ABSTRACT

A tractor-trailer parking control valve includes a spring-biased valve member movable within a chamber to control communication between a spring brake chamber port and an exhaust port and the spring brake chamber port and a source of fluid pressure. In a second chamber within the control valve housing is a two-way check valve which controls the supply of pressure from one of two reservoirs to the chamber of the spring-biased valve member.

4 Claims, 3 Drawing Figures

TRACTOR-TRAILER PARKING DASH CONTROL VALVE WITH TWO-WAY CHECK VALVE

This is a continuation, of application Ser. No. 575,469, filed May 7, 1975 and now abandoned.

SUMMARY OF THE INVENTION

The present invention relates to a tractor-trailer parking control valve in combination with a two-way check valve for protecting two sources of supply to release the spring brakes.

Another purpose is a simply constructed reliably operable combination valve of the type described.

Another purpose is a valve means which combines a two-way check valve, normally separated from the tractor-trailer parking dash control valve, into a single unitary structure.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
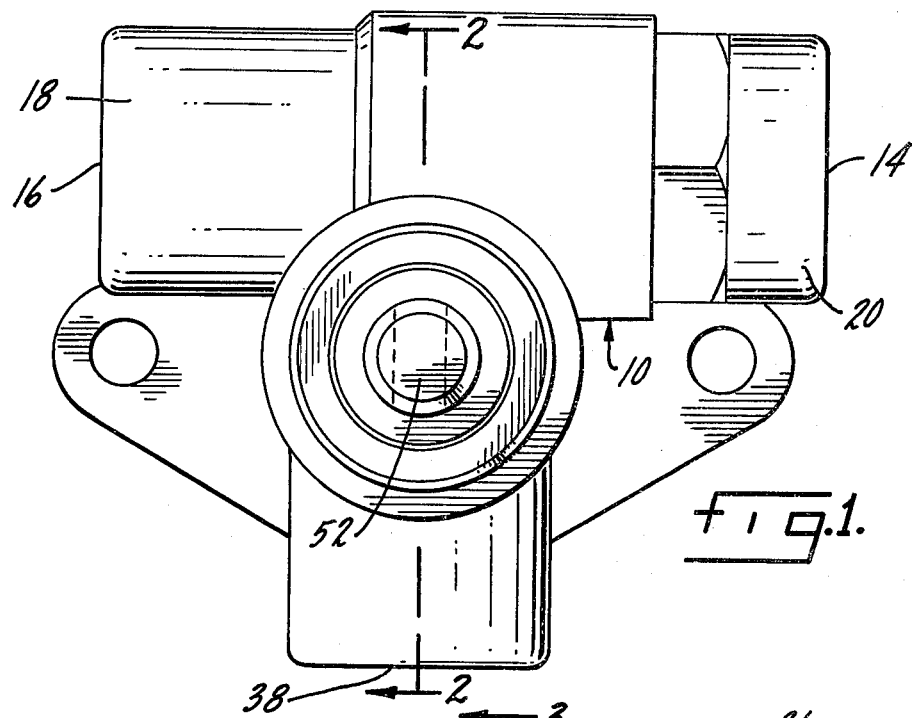
FIG. 1 is a plan view of a valve of the type described.

In a typical tractor brake system, there is a dash control valve for use in releasing the parking or emergency brakes. There are primary and secondary reservoirs which will supply the air necessary to release the parking brakes and conventionally these two reservoirs have been connected by a two-way check valve, through a conduit, to the tractor-trailer parking dash control valve. If there should be a rupture or leak in the conduit between the check valve and the dash control valve, pressure from both reservoirs would be lost and thus the brakes could not be released. The present invention combines the check valve with the dash control valve so that a break in the conduit between either reservoir and the valve disclosed herein will only result in a loss in pressure of one of the reservoirs, not both. The remaining reservoir can thus still be used to release the vehicle brakes.

A valve housing is indicated generally at 10 and may include a first chamber 12 having supply ports 14 and 16 at opposite ends thereof. That portion of the housing forming the first chamber 12 may be made up of a body portion 18 and a small fitting 20 which is threadedly engaged with the body portion 18, there being an O-ring or seal ring 22 at the point of attachment.

Positioned within chamber 12 is a bushing 24, the opposite ends of which are effective to seat seal members 26 and 28 about the entrances for supply ports 14 and 16. A ball member or valve member 30, which may be formed of steel or a similar suitable material, is movable within bushing 24, back and forth between seal members 26 and 28 to seal one or the other of supply ports 14 and 16. Thus, if pressure is lost at one of the supply ports, ball member 30 will be forced by the pressure from the other port, against the port having lost its pressure with the result that the low pressure port will be sealed and a secure supply of pressure will remain for chamber 12.

There is an opening 32 in bushing 24 which provides the outlet port for chamber 12.

Figure 2:
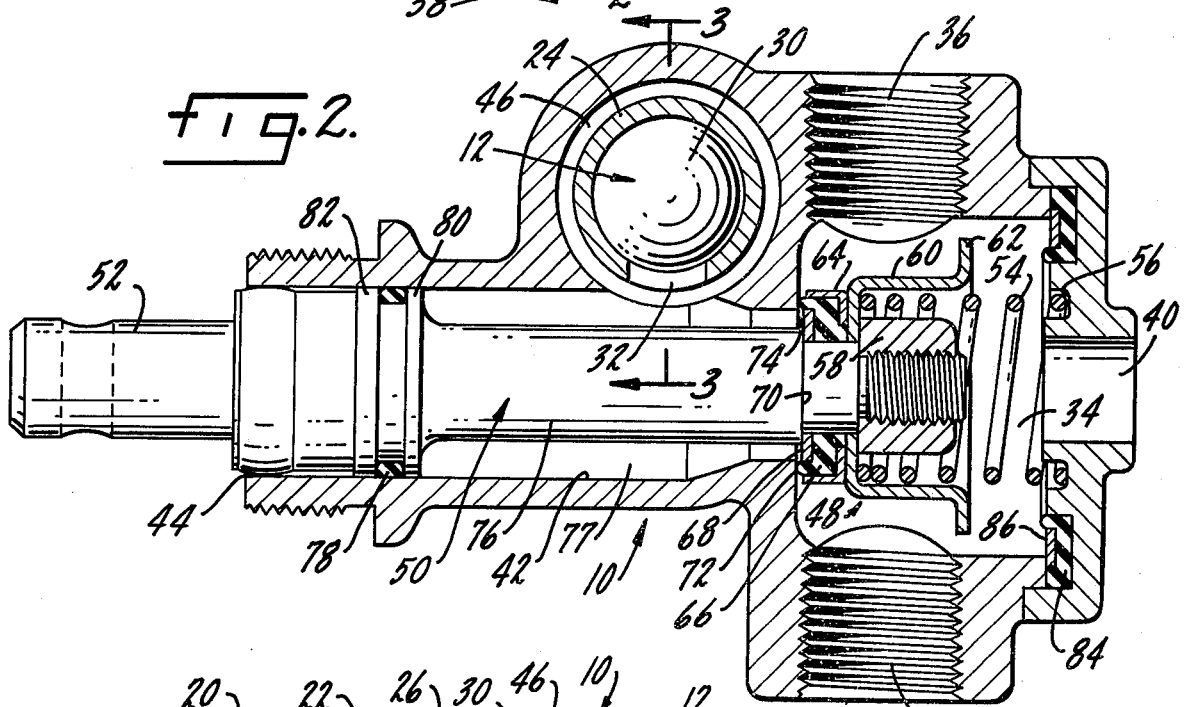
FIG. 2 is a section along plane 2—2 of FIG. 1.
Figure 3:
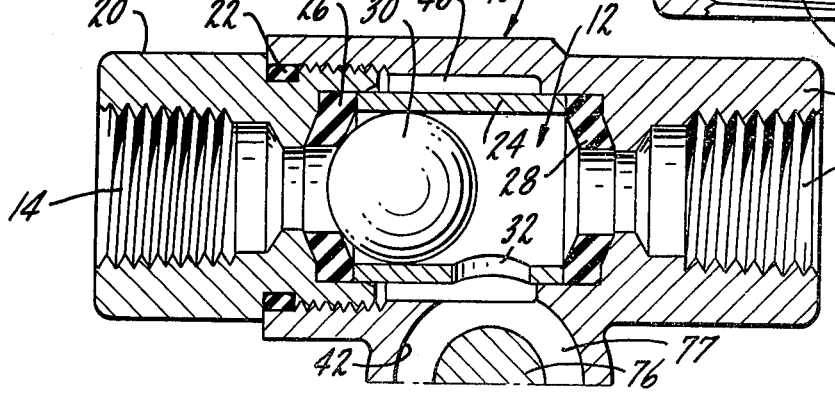
FIG. 3 is a section along plane 3—3 of FIG. 2.

Looking particularly at FIG. 2, a second chamber is indicated at 34 and there may be a pair of spring brake chamber ports 36 and 38 at opposite sides thereof and an exhaust port 40 intermediate ports 36 and 38. Chamber 34 is connected with a bore 42 which has an open end 44. A passage 46 connects bore 42 with outlet 32 in chamber 12 to thus connect chamber 12 with chamber 34.

Positioned within chamber 34 is a valve member indicated generally at 48 and having an operating stem 50 which extends through bore 42 and terminates in a shaft 52 which may accept a conventional handle. A coil spring 54 is bottomed within a groove 56 concentric with exhaust port 40 and urges valve member 48 to the position shown in FIG. 2.

Valve member 48 may include a nut 58 which holds a cup-shaped member 60 having a flange 62 to stem 50. Adjacent the cup-shaped member 60 is a shell 64, again somewhat cup-shaped, which encloses a seal member 66 held in place by a ring 68 bearing against a shoulder 70 on the stem 50. The seal member 66 may have an annular bead 72 which, when the valve member is in the position shown, bears against an annular surface 74 formed at the junction of bore 42 and chamber 34.

Stem 50 may have a portion 76 of reduced diameter, the outward end side of which is closed by a seal ring 78 formed between annular flanges 80 and 82 integral with stem 50. Thus, air entering annular portion 77 from passage 46, when the valve is in the position shown, will be trapped between the sealing surfaces formed by ring 78 and by seal member 66 which sealing surfaces may be generally of the same diameter.

A seal member 84, held in position by a steel washer 86, surrounds exhaust port 40. When valve member 48 is moved toward exhaust port 40, flange 62 will seat against seal member 84, thus forming a seal for the exhaust port.

When the valve is in the position shown, spring brake ports 36 and 38 are in communication with exhaust port 40 and thus the spring brakes are applied as they are conventionally spring-operated and pressure-released. Pressure from either one or both of the primary and secondary reservoirs will be supplied to inlet ports 14 and 16, with pressure from one of those reservoirs being slightly greater than pressure from the other, thus causing ball 30 to seat against one of the seal members 26 or 28. Pressure from one of the reservoirs will be supplied through outlet 32, passage 46, into the space 77 around stem 50 where it will be trapped between the two above-described sealing surfaces.

When the operator wishes to release the brakes so that the vehicle may proceed, he moves shaft 52 inwardly until flange 62 of cup-shaped member 60 seats against seal member 84 surrounding exhaust port 40. This will cut off communication between the spring brakes and exhaust and open communication between either the primary or secondary reservoir and the spring brake ports, thus supplying sufficient pressure to release the brakes.

The valve will stay in the position shown, providing there is sufficient pressure in the reservoirs to overcome the force of coil spring 54, generally approximately 35 psi. Thus, the spring brakes will stay released as long as that amount of pressure is available from either or both of the primary and secondary reservoirs. If the pressure should drop down below approximately 35 psi, spring 54 will move the valve to the position shown which will connect the spring brake ports to exhaust and close off any communication between the spring brakes and the source of pressure at either inlet port 14 or inlet port 16.

Of particular importance is the simply constructed reliably operable overall valve configuration. The two-way check valve utilizes a single valve member, for example a ball which is movable between two generally identical seats spaced at opposites ends of a chamber. The check valve is a portion of and integral with the housing forming the dash control valve. In one position of the dash control valve the spring brake chambers are directly connected to exhaust and in the other position, the spring brake chambers are directly connected to the supply of pressure from the two-way check valve.

Whereas the preferred form of the invention has been shown and described herein, it should be realized that there may be many modifications, substitutions and alterations thereto.

The embodiments of the invention in which an exclusive property or privilege is claimed are defined as follows:

1. In a tractor-trailer parking control valve, a housing, a first chamber in said housing, a pair of air pressure inlet ports in said housing opening into said first chamber, valve seat means about each of said inlet ports, a valve member within said chamber and positioned to close either inlet port by seating against one of said valve seat means, a second chamber in said housing, at least one spring brake chamber port and an exhaust port opening into said second chamber, a spring-biased valve member in said second chamber for opening and closing communication between said spring brake chamber port and exhaust port, an annular elastomeric valve seat surrounding said exhaust port, a seating surface on said spring-biased valve member positioned to close upon said elastomeric valve seat, and a coil spring in said second chamber normally urging said seating surface away from said valve seat, passage means between said first and second chamber including a bore within said housing in communication with said second chamber and opening to the exterior of said housing, said passage means including a passage between said bore and first chamber, a valve stem connected to said spring-biased valve member and movable in said passage means bore, a seal carried by said spring-biased valve member and positioned to close communication between said second chamber and said passage means bore, a seal member carried by said valve stem and bearing against said bore, said passage being in communication with said bore intermediate said seal and seal member, said spring-biased valve member controlling communication between said passage means and said brake chamber port.

2. The structure of claim 1 further characterized in that said first chamber inlet ports are positioned at opposite ends thereof, with said first chamber valve member being movable between the valve seat means at each of said inlet ports.

3. The structure of claim 2 further characterized in that said valve seat means includes an elastomeric seal member associated with each inlet port, said valve member being a ball positioned within said first chamber, and a first chamber outlet port associated with said passage means and positioned intermediate said inlet ports.

4. The structure of claim 1 further characterized in that said spring-biased valve member opens communication between said brake chamber port and exhaust port and closes communication between said brake chamber port and said passage means in one position thereof, and closes communication between said brake chamber port and exhaust port and opens communication between said brake chamber port and passage means in another position thereof.

* * * * *